(12) United States Patent
Neet et al.

(10) Patent No.: US 6,930,426 B2
(45) Date of Patent: Aug. 16, 2005

(54) ALTERNATOR STATOR HAVING A MULTIPLE FILAR CONSTRUCTION TO IMPROVE CONVECTIVE COOLING

(75) Inventors: Kirk E. Neet, Saline, MI (US); Kevin Roy Harpenau, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/723,527

(22) Filed: Nov. 26, 2003

(65) Prior Publication Data

US 2005/0110360 A1 May 26, 2005

(51) Int. Cl.$^7$ .............................................. H02K 17/00
(52) U.S. Cl. ...................................... 310/208; 310/201
(58) Field of Search ............................... 310/179, 180, 310/201, 208

(56) References Cited

U.S. PATENT DOCUMENTS

| | | | |
|---|---|---|---|
| 3,566,171 A | 2/1971 | Tichy et al. ............... 310/195 |
| 3,634,708 A | 1/1972 | Fisher et al. ............... 29/196 |
| 3,750,273 A | 8/1973 | Beddows .................. 310/171 |
| 3,809,936 A | 5/1974 | Klein ........................... 29/596 |
| 3,824,683 A | 7/1974 | Rhudy ....................... 310/171 |
| 4,115,915 A | 9/1978 | Godfrey ...................... 29/596 |
| 4,260,924 A | 4/1981 | Lugosi et al. ............... 310/213 |
| 4,307,311 A | 12/1981 | Grozinger .................. 310/179 |
| 4,329,764 A | 5/1982 | Sakaue et al. .............. 29/33 F |
| 4,331,896 A | 5/1982 | Sedgewick ................. 310/179 |
| 4,337,567 A | 7/1982 | Lugosi et al. .............. 291/596 |
| 4,399,843 A | 8/1983 | Sedgwick .................. 140/92.2 |
| 4,405,553 A | 9/1983 | Lovgren et al. ........ 264/272.19 |
| 4,451,749 A | 5/1984 | Kanayama et al. ........... 310/62 |
| 4,556,811 A | 12/1985 | Hendricks .................. 310/286 |
| 4,587,824 A | 5/1986 | Wiersema et al. ............ 72/217 |
| 4,617,725 A | 10/1986 | Holter et al. ................. 29/598 |
| 4,663,551 A | 5/1987 | Weh et al. .................. 310/152 |
| 4,928,042 A | 5/1990 | Harms et al. ............... 818/254 |
| 5,115,556 A | 5/1992 | Gavrilidis et al. ............ 29/596 |
| 5,343,105 A | 8/1994 | Sakabe et al. .............. 310/179 |
| 5,394,321 A | 2/1995 | McCleer et al. ............ 310/131 |
| 5,444,321 A | 8/1995 | Honda et al. ............... 370/263 |
| 5,449,962 A | 9/1995 | Shichijyo et al. ........... 310/184 |
| 5,519,266 A | 5/1996 | Chitayat ....................... 310/12 |
| 5,539,265 A | 7/1996 | Harris et al. ................ 370/283 |
| 5,642,009 A | 6/1997 | McCleer et al. ....... 310/156.35 |
| 5,722,153 A | 3/1998 | Holmes et al. ............... 29/598 |
| 5,787,567 A | 8/1998 | Miyazaki ..................... 29/596 |
| 5,926,940 A | 7/1999 | Toh et al. ..................... 29/596 |
| 5,936,326 A | 8/1999 | Umeda et al. .............. 310/179 |

(Continued)

FOREIGN PATENT DOCUMENTS

| | | |
|---|---|---|
| EP | 0751609 A2 | 1/1997 |
| EP | 1211781 A1 | 6/2002 |
| WO | WO 99/34499 | 7/1999 |

OTHER PUBLICATIONS

U.S. Appl. No. 10/324,319, filed Dec. 19, 2002.

Primary Examiner—Dang Le
(74) Attorney, Agent, or Firm—Brinks Hofer Gilson & Lione (57) ABSTRACT

A stator for a dynamoelectric machine improves the cooling of the stator winding without increasing the size of the stator winding or the entire stator. The stator is of a unique construction wherein the size, and more specifically the cross sectional area or volume of the individual conductors is greatly reduced, while the total number of conductors is increased. In addition, a multiple filar construction is employed to avoid the potential for high levels of inductance and resistance in the conductors and to minimize the interference between the cascaded stator end loops and the housing that surrounds the stator.

28 Claims, 8 Drawing Sheets

U.S. PATENT DOCUMENTS

| | | | |
|---|---|---|---|
| 5,955,804 A | 9/1999 | Kusase et al. | 310/59 |
| 5,955,810 A | 9/1999 | Umeda et al. | 310/208 |
| 5,962,943 A | 10/1999 | Shervington | 310/156.37 |
| 5,965,965 A | 10/1999 | Umeda et al. | 310/52 |
| 5,986,375 A | 11/1999 | Umeda et al. | 310/180 |
| 5,994,802 A | 11/1999 | Shichijyo et al. | 310/51 |
| 5,998,903 A | 12/1999 | Umeda et al. | 310/179 |
| 6,011,332 A | 1/2000 | Umeda et al. | 310/58 |
| 6,037,695 A | 3/2000 | Kanazawa et al. | 310/263 |
| 6,051,906 A | 4/2000 | Umeda et al. | 310/179 |
| 6,059,969 A | 5/2000 | Mizutani | 310/263 |
| 6,078,116 A | 6/2000 | Shiga et al. | 310/60 R |
| 6,091,169 A | 7/2000 | Umeda et al. | 310/62 |
| 6,097,130 A | 8/2000 | Umeda et al. | 310/263 |
| 6,124,660 A | 9/2000 | Umeda et al. | 310/215 |
| 6,137,201 A | 10/2000 | Umeda et al. | 310/179 |
| 6,137,202 A | 10/2000 | Holmes et al. | 310/180 |
| 6,140,735 A * | 10/2000 | Kato et al. | 310/201 |
| 6,147,430 A | 11/2000 | Kusase et al. | 310/115 |
| 6,147,432 A | 11/2000 | Kusase et al. | 310/260 |
| 6,166,461 A | 12/2000 | Kusase et al. | 310/58 |
| 6,177,747 B1 | 1/2001 | Maeda et al. | 310/179 |
| 6,181,043 B1 | 1/2001 | Kusase et al. | 310/201 |
| 6,181,045 B1 | 1/2001 | Umeda et al. | 310/201 |
| 6,201,332 B1 | 3/2001 | Umeda et al. | 310/184 |
| 6,204,586 B1 | 3/2001 | Umeda et al. | 310/179 |
| 6,208,060 B1 | 3/2001 | Kusase et al. | 310/254 |
| 6,211,594 B1 | 4/2001 | Umeda et al. | 310/180 |
| 6,222,295 B1 | 4/2001 | Umeda et al. | 310/179 |
| 6,242,836 B1 | 6/2001 | Ishida et al. | 310/215 |
| 6,252,326 B1 | 6/2001 | Umeda et al. | 310/179 |
| 6,268,678 B1 | 7/2001 | Asao et al. | 310/201 |
| 6,281,614 B1 | 8/2001 | Hill | 310/207 |
| 6,285,105 B1 | 9/2001 | Asao et al. | 310/208 |
| 6,291,918 B1 | 9/2001 | Umeda et al. | 310/215 |
| 6,333,573 B1 | 12/2001 | Nakamura | 310/45 |
| 6,335,583 B1 | 1/2002 | Kusase et al. | 310/254 |
| 6,337,530 B1 | 1/2002 | Nakamura et al. | 310/208 |
| 6,348,751 B1 | 2/2002 | Jermakian et al. | 310/207 |
| 6,373,164 B1 * | 4/2002 | Nishimura | 310/207 |
| 6,417,592 B2 | 7/2002 | Nakamura et al. | |
| 6,501,205 B1 * | 12/2002 | Asao et al. | 310/184 |
| 6,515,393 B2 | 2/2003 | Asao et al. | 310/184 |
| 6,552,463 B2 | 4/2003 | Oohashi et al. | 310/201 |
| 2001/0011852 A1 | 8/2001 | Nakamura et al. | 310/215 |
| 2001/0019234 A1 | 9/2001 | Murakami et al. | 310/180 |
| 2001/0020807 A1 | 9/2001 | Imori et al. | 310/254 |
| 2001/0024071 A1 | 9/2001 | Yoshida et al. | 310/201 |
| 2001/0026109 A1 | 10/2001 | Higashino et al. | 310/201 |
| 2001/0030487 A1 | 10/2001 | Higashino et al. | 310/263 |
| 2001/0038251 A1 | 11/2001 | Nakamura | 310/180 |
| 2001/0040415 A1 | 11/2001 | Asao et al. | 310/201 |
| 2001/0040416 A1 | 11/2001 | Nakamura et al. | 310/201 |
| 2001/0040418 A1 | 11/2001 | Higashino et al. | 310/263 |
| 2002/0063490 A1 | 5/2002 | Asao et al. | 310/207 |

* cited by examiner

ALTERNATOR STATOR HAVING A MULTIPLE FILAR CONSTRUCTION TO IMPROVE CONVECTIVE COOLING

FIELD OF THE INVENTION

The invention relates to dynamoelectric machines having a stator and rotor, and particularly to an alternator having a stator winding designed to improve alternator efficiency.

BACKGROUND OF THE INVENTION

This invention is related to dynamoelectric machines such as an electrical alternator, including those of a type particularly adapted for use in motor vehicle applications. These devices are typically mechanically driven using a drive belt wrapped on a pulley connected to the crankshaft of the vehicle's internal combustion engine. The belt drives a pulley on the alternator which rotates an internal rotor assembly to generate alternating current (AC) electrical power. This alternating current electrical power is rectified to direct current (DC) and supplied to the motor vehicle's electrical bus and storage battery.

While alternators have been in use in motor vehicles for many decades, today's demands on motor vehicle design, cost, and performance have placed increasing emphasis on the design of more efficient alternators. Today's motor vehicles feature a dramatic increase in the number of electrical on-board systems and accessories. Such electrical devices include interior and exterior lighting, climate control systems; and increasingly sophisticated power train control systems, vehicle stability systems, traction control systems, and anti-lock brake systems. Vehicle audio and telematics systems place further demands on the vehicle's electrical system. Still further challenges in terms of the output capacity of the motor vehicle's electrical alternators will come with the widespread adoption of electrically assisted power steering and electric vehicle braking systems. Compounding these design challenges is the fact that the demands on the vehicle's electrical system vary widely, irrespective of the engine operating speed which drives the alternator and changes through various driving conditions.

In addition to the challenges of providing high electrical output for the vehicle electrical alternator, further constraints include the desire to minimize the size of the alternator with respect to under hood packaging limitations, and its mass which relates to the vehicle's fuel mileage.

In addition to the need of providing higher electrical output, designers of these devices further strive to provide high efficiency in the conversion of mechanical power delivered by the engine driven belt to electrical power output. Such efficiency translates directly into higher overall thermal efficiency of the motor vehicle and thus into fuel economy gains. And finally, as is the case with all components for mass-produced motor vehicles, cost remains a factor in the competitive offerings of such components to original equipment manufacturers.

Enhanced efficiency of the alternator can be provided through various design approaches. The alternator uses a rotating rotor assembly, which creates a rotating alternating polarity magnetic field. This rotating magnetic field is exposed to an annular stator assembly which closely surrounds the rotor assembly. Electrical conductor windings are embedded within the stator assembly. As is well known in the art, it is desirable to cool the conductors because the electrical resistance of the conductor is proportional to the temperature of the wire. Since the resistance of the conductor is inversely proportional to alternator output and efficiency, cooling of the stator winding is an important factor for improving alternator output and efficiency.

Unfortunately, many stator core assemblies utilize windings that do not promote cooling of the conductors. Some alternator designs employ conventional wire conductors having a round cross sectional shape wound into radially projecting slots formed In the stator core. These round cross-sectional wires are nested against other turns of wire in the slots in a random winding pattern that results in the turns being bunched together with no or very little openings to allow cooling air to pass in between the conductors. This arrangement thus limits convective cooling of the stator winding. Accordingly, there exists a need for a stator assembly that increases the efficiency of the alternator by improving the cooling of the stator winding, while at the same time preventing unwanted increases in size and cost of the alternator or dynamoelectric machine.

BRIEF SUMMARY OF THE INVENTION

The present invention provides stator for a dynamoelectric machine which improves the cooling of the stator winding without increasing the size of the stator winding or the entire stator. The stator is of a unique construction wherein the size, and more specifically the cross-sectional area of the individual conductors is greatly reduced, while the total number of conductors is increased. In addition, a multiple filar construction is employed to avoid the potential for high levels of inductance and resistance in the conductors, as will be discussed in more detail herein.

The stator generally includes a stator core having a generally cylindrical shape. The stator core has a plurality of circumferentially spaced core slots for receiving a stator winding. The stator winding includes a plurality of conductors. Each conductor has a plurality of straight segments interconnecting a plurality of end loop segments. The plurality of conductors are organized into at least a first filar and a second filar. The conductors of the first filar are electrically connected In parallel to the conductors of the second filar. The straight segments of the first and second filars reside in common slots in the stator core. Further, the end loop segments of the first and second filars are circumferentially aligned and axially opposite each other.

According to more detailed aspects, the plurality of conductors are preferably structured in phases defined by a circumferential pitch. Each phase generally includes a conductor forming the first filar and a conductor forming the second filar. The unique construction of the stator allows the number of layers to be greater than six. The multiple filar construction allows the number of turns of the stator winding to be less than the number of layers, and is preferably equal to the number of layers divided by the number of filars. The conductors preferably have a cascaded or interlaced construction, which in combination with the phasing and the shape of the end loops, results in the conductors being structured to define air flow paths to cool the conductors. Preferably, the air flow paths extend between the layers of the stator winding.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 2A is a perspective view of the stator core depicted in FIG. 1, while

DETAILED DESCRIPTION OF THE INVENTION

Figure 1:
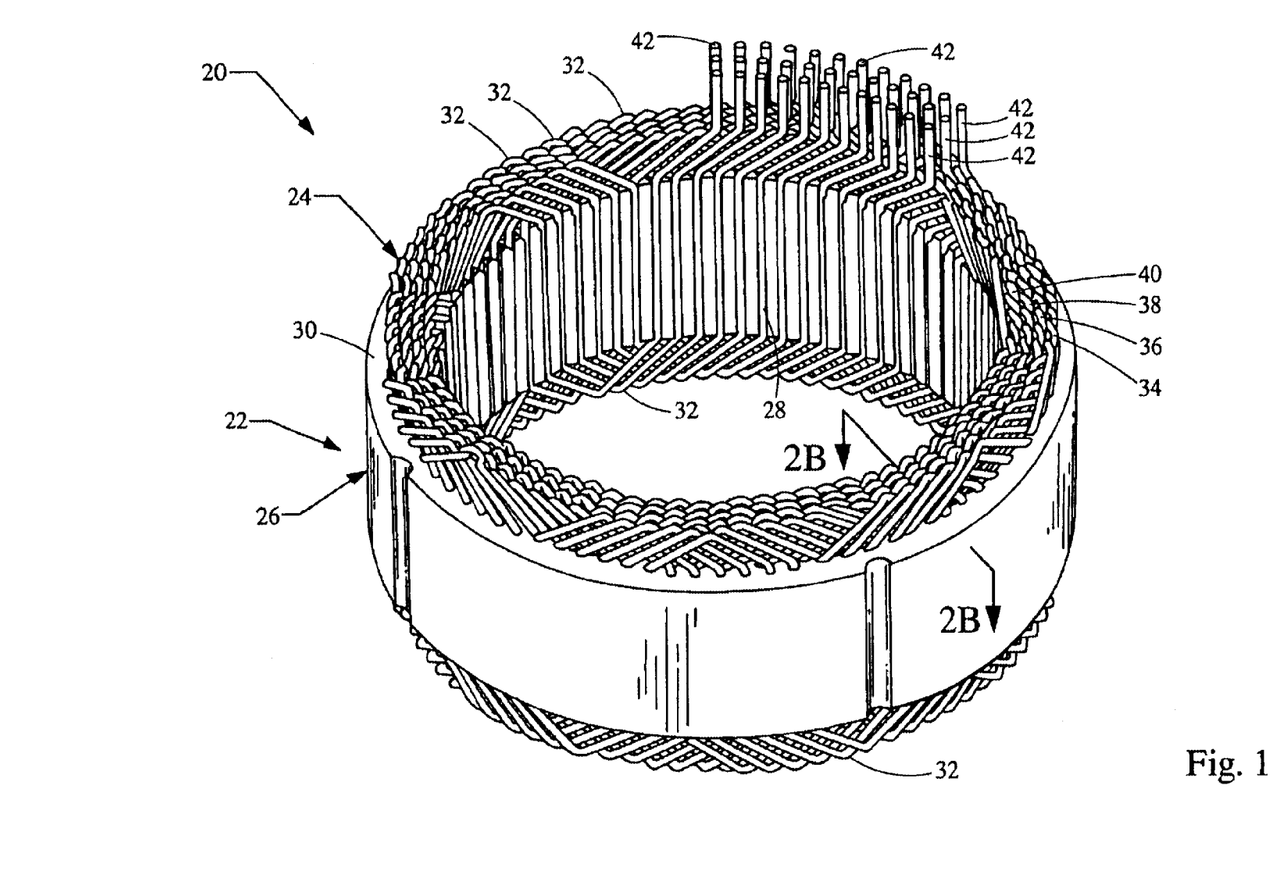
FIG. 1 is a perspective view of an embodiment of the stator constructed in accordance with the teachings of the present invention.

Turning now to the figures, FIG. 1 depicts a perspective view of the stator 20 constructed in accordance with the teachings of the present invention. The stator 20 generally comprises a stator core 22 and a stator winding 24. A unique stator winding 24 is employed to improve the cooling of the winding without increasing its size. As noted above, to maximize output and efficiency of the alternator, the winding 24 and each of its conductors must be effectively cooled. It is also desirable to lower the temperature of the insulation on the conductors to prolong the life of the insulation and consequently the alternator.

The temperature rise of each conductor is directly related to the surface area of the conductor. To reduce the temperature rise, it is desirable to increase the surface area of the conductors to increase their convective cooling. For a typical rectangular or square conductor having a width h and a depth b, the cross-sectional surface area equals 2b+2h. For those skilled in the art, it is understood that the term rectangular or square may in fact include radii on the corners of the conductor. However, if this conductor is split in half across its width, the cross-sectional surface area equals 2(2b+(2×½h)) or 4b+2h. For the case where the original wire is square (b=h) and either b or h is cut in half, there is a 50% increase in surface area. Generally, the greatest dimension of the width and depth of a prior conductor is in the range of 2 mm to 4 mm. In accordance with the present invention, the greatest dimension of the width and depth is now in the range of 1 mm to 2 mm, and most preferably less than 2 mm. Therefore, the stator winding 24 is constructed to utilize a greater number of conductors having a smaller average cross sectional area, which are wound around the stator core 22 in a unique fashion that improves the efficiency of the alternator.

Figure 2A:
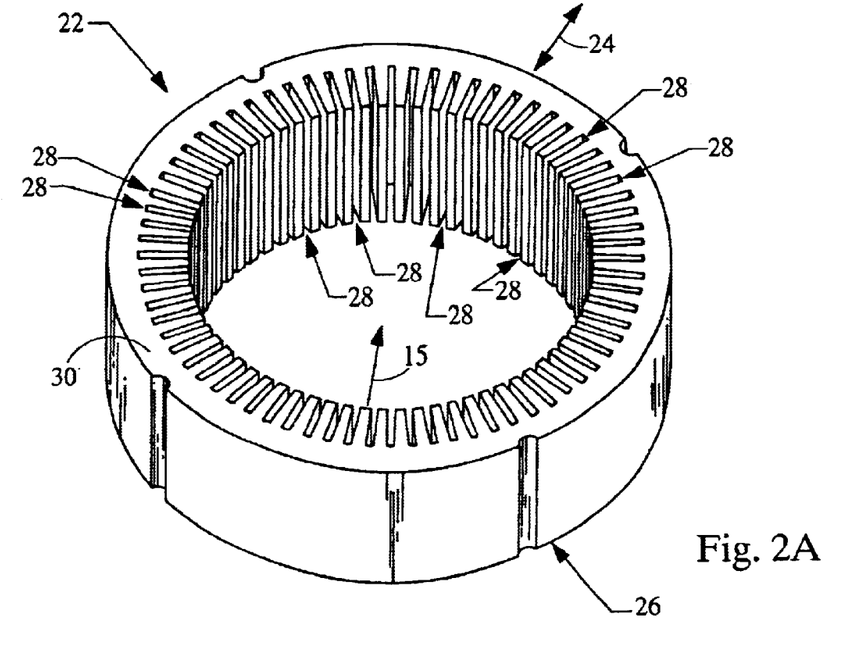

The stator core 22 is best seen In FIG. 2a, and generally includes a cylindrical body 26 defining a plurality of slots 28 for receiving the stator winding 24. The slots 28 are equidistantly and circumferentially spaced around the cylindrical body 26. The slots 28 extend axially through the body 26, from a first axial side 30 to a second axial side (not shown). The slots 28 also open radially inwardly to the interior of the stator core 22. The radial inward direction has been generally indicated by arrow 15.

The stator winding 24 is generally comprised of a plurality of conductors 32 which are wound around the stator core 22 by way of the plurality of slots 28. Each conductor includes a starting and ending lead 42 which are utilized to provide electrical connection of the stator winding 24 to the rectifier to form a ring (commonly known as a delta type for a three phase) or star (commonly known as a wye type for a three phase) configuration. For those skilled in the art, it is understood that the plurality of phases may be connected to each other in a plurality of ring or star combinations.

Figure 3:
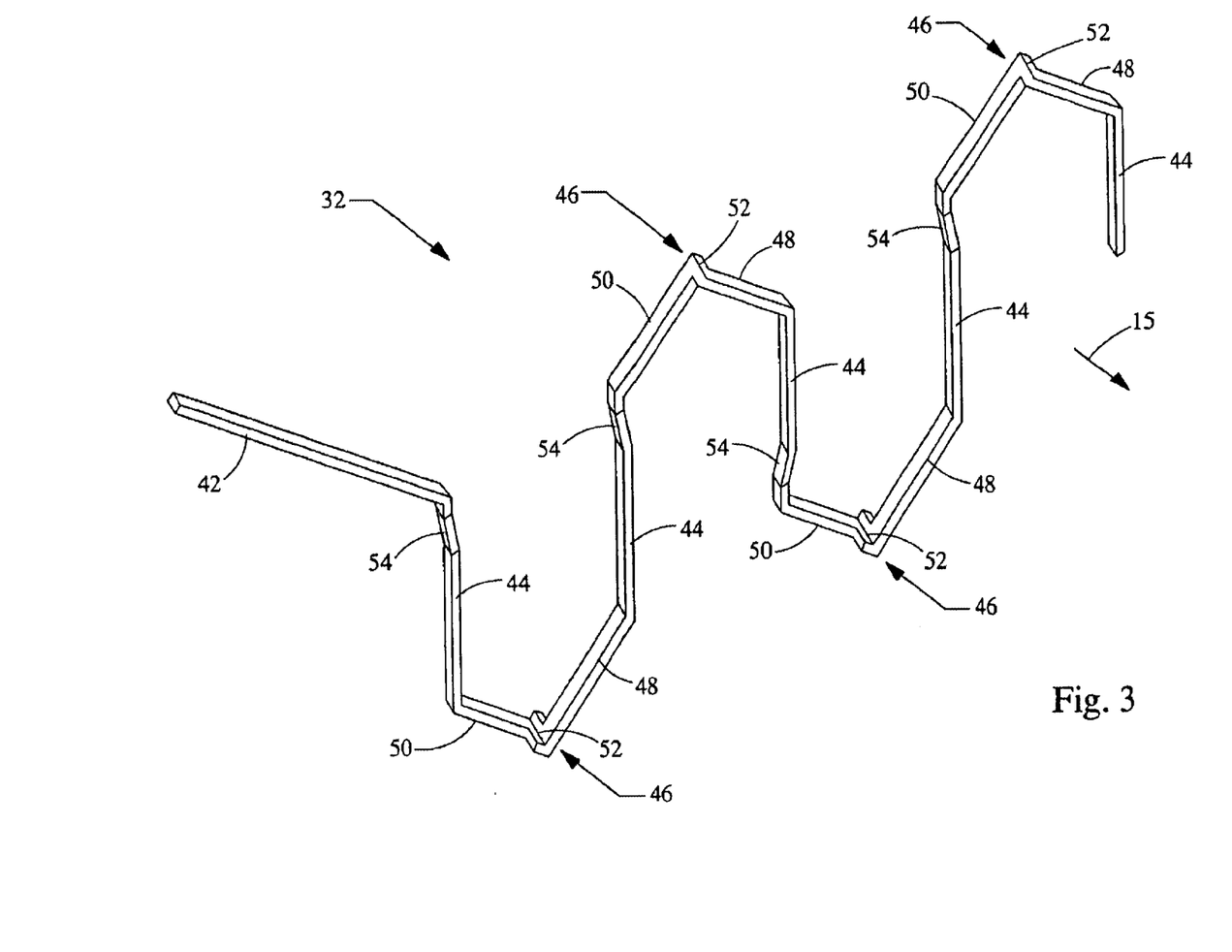
FIG. 3 is a perspective view of an individual conductor forming the stator winding.

First a description of a Individual conductor will be described, and then the organization of the plurality of conductors 32 will be categorized and explained. With reference to FIG. 3, an individual conductor 32 generally comprises a wire having a number of segments. A lead segment 42 is utilized for electrical connection of the conductor 32 as described above. The remainder of the conductor 32 generally comprises a plurality of straight segments 44 interconnecting a plurality of end loop segments 46. The straight segments 44 represent the portion of the conductor 32 which extends through the stator core 22 and resides in the core slots 28. The end loops 46 extend axially outwardly from the cylindrical body 26 of the stator core 22, as is shown in FIG. 1. The end loops 46 alternate between the axial sides of the stator 20.

Figure 4:
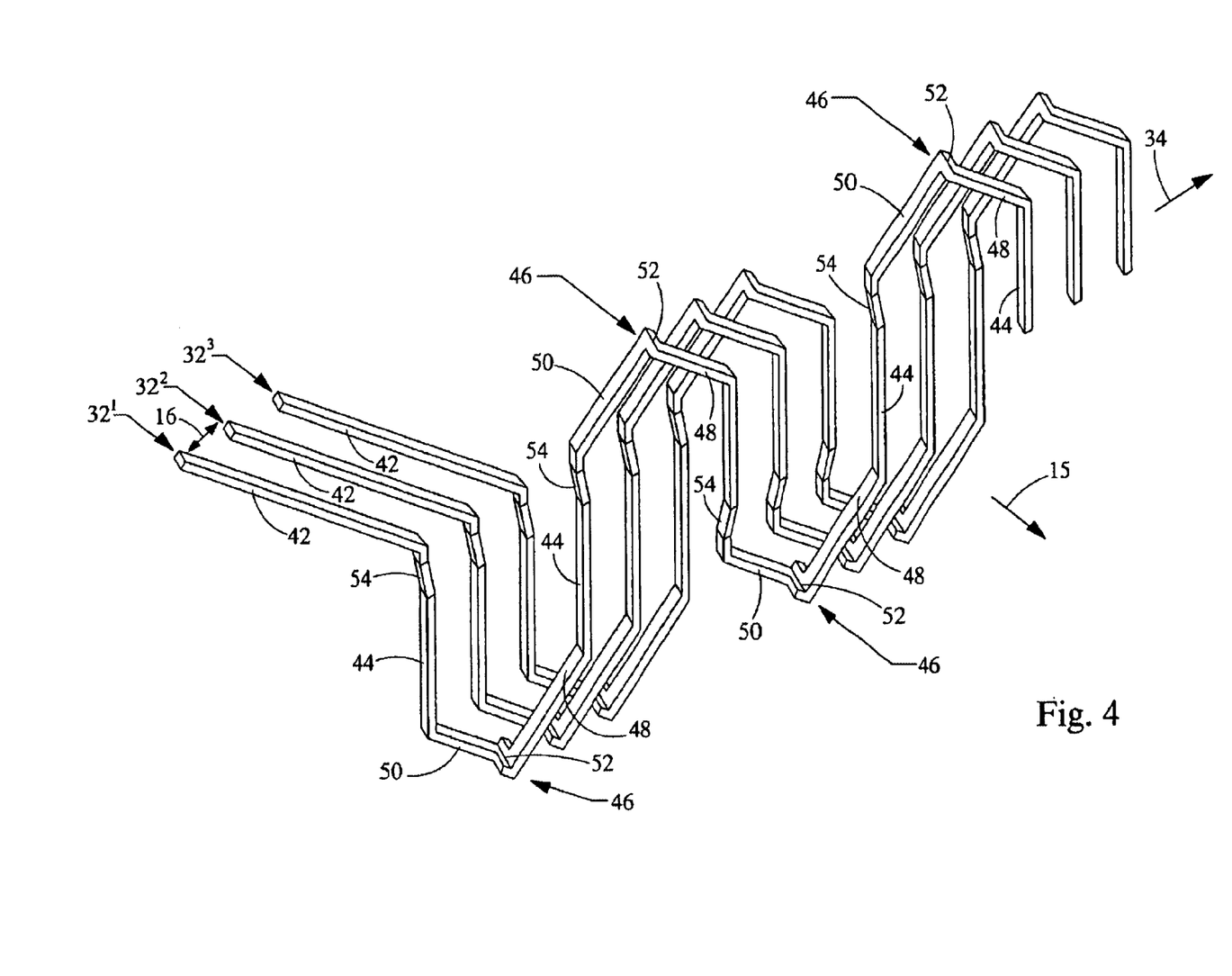
FIG. 4 is a perspective view of three conductors separated into phases.

As best seen in FIG. 4, each end loop segment 46 generally comprises a first leg 48, and a second leg 50 meeting at an apex of the end loop 46. The first leg 48 extends away from a slot at an angle, which can be described as extending axially away from the core while extending clockwise circumferentially. The second leg 50 extends away from a slot at an angle, which can be described as extending axially away from the core while extending counterclockwise circumferentially. The two legs meet at the apex of the loop 46, thereby forming an inverted triangle. For those skilled in the art, it is understood that one leg, 48 or 50, may only extend axially away form the core while the other leg extends axially away from the core and circumferentially.

At the apex of the loop 46, a radial extension 52 is defined and interconnects the first and second legs 48, 50. The second leg 50 of the end loop segment 46 is interconnected with the second straight segment 44 via a second radial extension 54. The first radial extension 52 shifts the conductor radially outwardly (the radial Inward direction is indicated by arrow 15), while the second radial extension 54 shifts the conductor radially inwardly. It can thus be seen that each straight segment 44 of a conductor generally resides in the same radial position within the stator slot 28, thereby forming a cascaded construction. The present invention may also employ an interlaced construction, wherein the second radial extension 54 is eliminated and thus it can be realized that consecutive straight segments 44 reside in alternating radial positions within the stator slots 28. Therefore, although both cascaded and interlaced constructions include a set of straight segments 44 located equidistant radial positions in the stator slots 28, only the cascade construction includes a plurality of consecutive straight segments 44 located in equidistant radial positions or in the same layer, as described further herein.

Figure 2B:
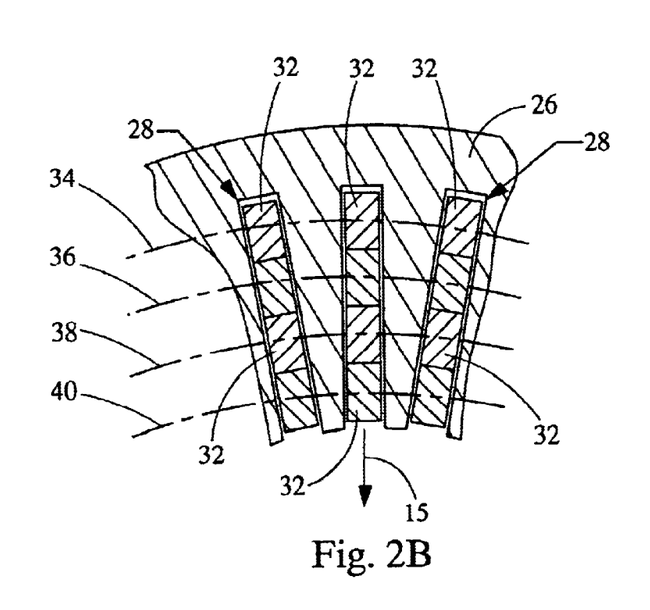
FIG.2B is a cross-sectional view of the core depicted in FIG. 2A.

The conductors 32 are structured and organized in several different ways. First, the conductors can be characterized by what layer or layers their straight segments 44 reside in. With reference to FIGS. 1 and 2b, the body 26 of the stator core 22 defines slots 28 which receive the straight segments 44 of the conductors 32, as previously discussed. The conductors 32 can be characterized by what layer they reside in, which refers to the radial position of the conductor's straight segments 44 within the slot 28. As shown in FIG. 2b, the slots 28 receive conductors 32 at a first layer 34, a second layer 36, a third layer 38 and a fourth layer 40, as denoted by the dotted lines. As also can be seen in FIG. 2b, the conductors 32 may be aligned in one radial row within the slots 28 and may have widths that fit closely, including any insulation, to the width of the slots 28. It can thus be seen that corresponding binding radial positions in each of the slots 28 define the layers 34–40. Stated another way, the straight segments of the conductors 32 of all of the phases in the outer most radial position define the first layer 34, and so on as the straight segments 44 of the conductors 32 fill radially inward positions. Preferably the straight segments of the conductors 32 reside in a common layer for each substantial revolution around the stator core. Furthermore, the conductor 32 may be continuous in that it may include a plurality of consecutive straight segments that reside in layer 34 for one substantial revolution, and a plurality of consecutive straight segments that reside in another layer, such as 38, for another substantial revolution and so forth.

It can now be seen that the radial extensions 52 at the peak of each end loop 46 briefly position the end loop 46 (and more specifically the second leg 50) in an adjacent layer, while the second radial extension shifts the conductor back into the original layer occupied by the other straight segments 44 and first legs 48. It will be recognized by those skilled in the art that in a multiple turn winding (i.e. 2 turns or greater), each conductor will have straight segments residing in multiple layers, i.e. a first layer during the first turn, a second layer during the second turn, etc.

Second, the structure of each conductor 32 allows the stator winding 24 to be organized into phases, as will be described with reference to FIG. 4. The first and second radial extensions 52, 54 allow a number of conductors 32 to be positioned in a cascading structure having multiple phases. Three phases have been depicted in FIG. 4, defined by a first conductor $32^1$, a second conductor $32^2$, and a third conductor $32^3$. Although three phases have been depicted in FIG. 4, FIG. 6 and FIG. 7, it is commonly understood by those skilled in the art that any number of phases can be utilized. Each of the conductors $32^1$, $32^2$, $32^3$ are substantially identical, except they have been spaced a circumferential pitch or distance denoted by arrow 16. Accordingly, only the first conductor $32^1$ includes detailed reference numerals as the other conductors $32^2$ and $32^3$ are substantially identical. It can also be seen that the first and second radial extensions 52, 54 located proximate the end loop segments 46 allow the three end loop segments 46 to overlap, while also maintaining each straight segment 44 in a single layer denoted as layer 34. Each of the three phases is electrically connected by way of a ring (delta) connection or star (wye) connection, as is well known in the art, for providing current to the vehicle. The structure and phasing of the conductors 32 provides fixed spacing to define air flow paths between the conductors, and more specifically between the end loop segments 46. This structure of the stator winding 24 can be referred to as a cascaded structure, however the plurality of conductors 32 could also form an interlaced structure wherein the straight segments 44 reside in alternating layers to define an interweaved pattern.

Figure 5:
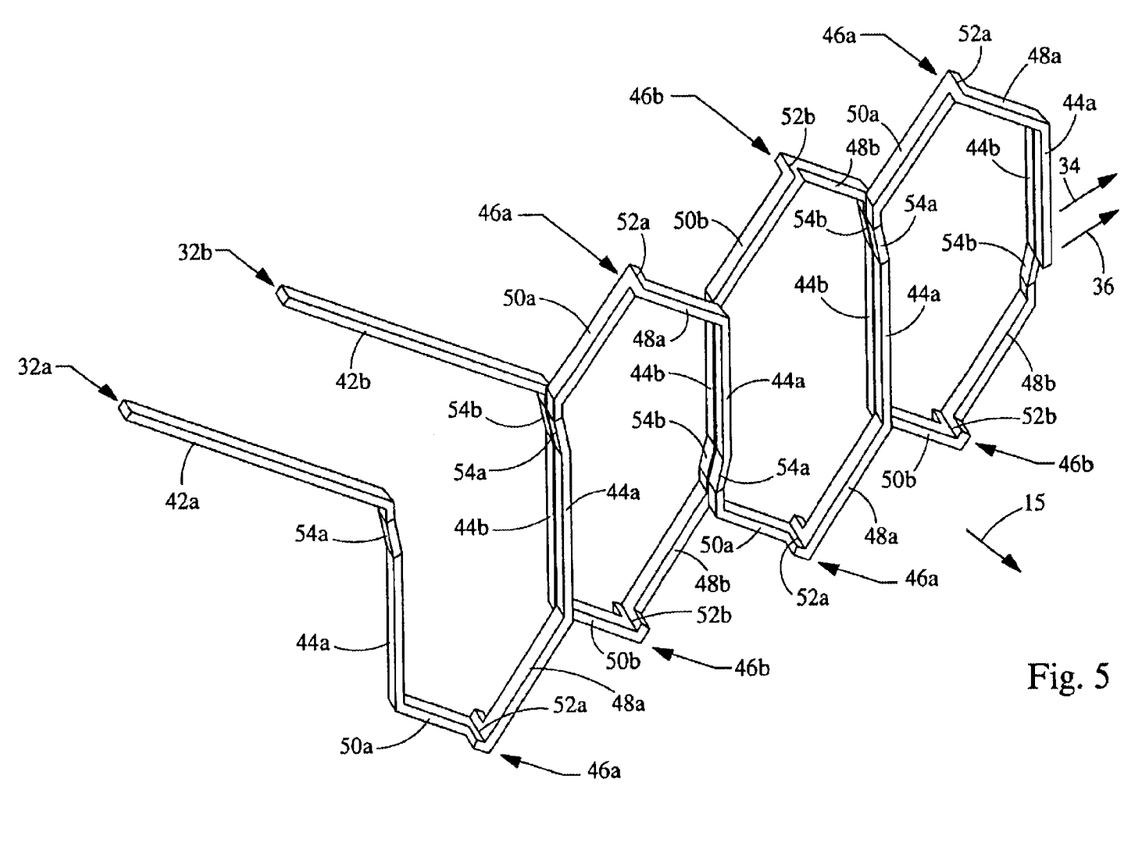
FIG. 5 is a perspective view of two conductors forming a bi-filar relationship.
Figure 8:
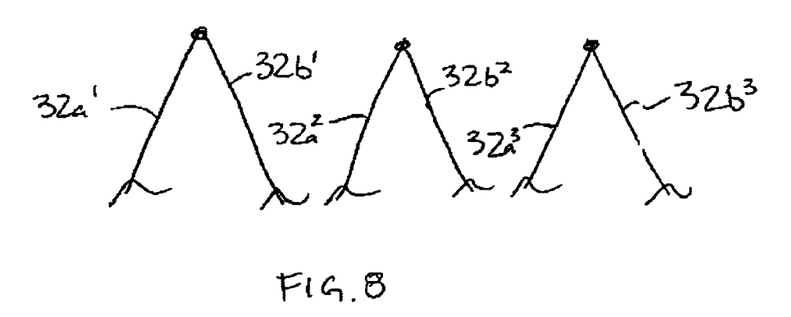
FIG. 8 is a schematic depiction of the leads of the conductors depicted in FIGS. 6 and 7.

Finally, the plurality of conductors 32 forming the stator winding 24 are organized into filars. In accordance with the present invention, a multiple filar construction is employed, such as a bi-filar, tri-filar, etc. As used herein, a multiple filar construction is defined as a set of conductors electrically connected. A bi-filar construction is depicted in FIG. 5. A first conductor 32a and a second conductor 32b are depicted and are electrically connected (FIG. 8). The two conductors 32a, 32b are prepared to sit within the stator core 22 in a fashion whereby the straight segments 44a, 44b reside in common slots 28 (i.e. aligned circumferential positions). Further, the end loops 46a, 46b of the filars are located axially opposite the other filar. That is, the end loops 46a of the first filar are generally located directly axially opposite the end loops 46b of the second filar. In this way, the correct frequency and phase of the current induced in each conductor 32a, 32b are aligned such that they are additive, and thus do not cancel each other out by way of their parallel electrical connection. It can also be seen that the straight segments 44a of conductor 32a all reside in layer 30, while the straight segments 44b of the other conductor 32b reside in layer 34.

Figure 6:
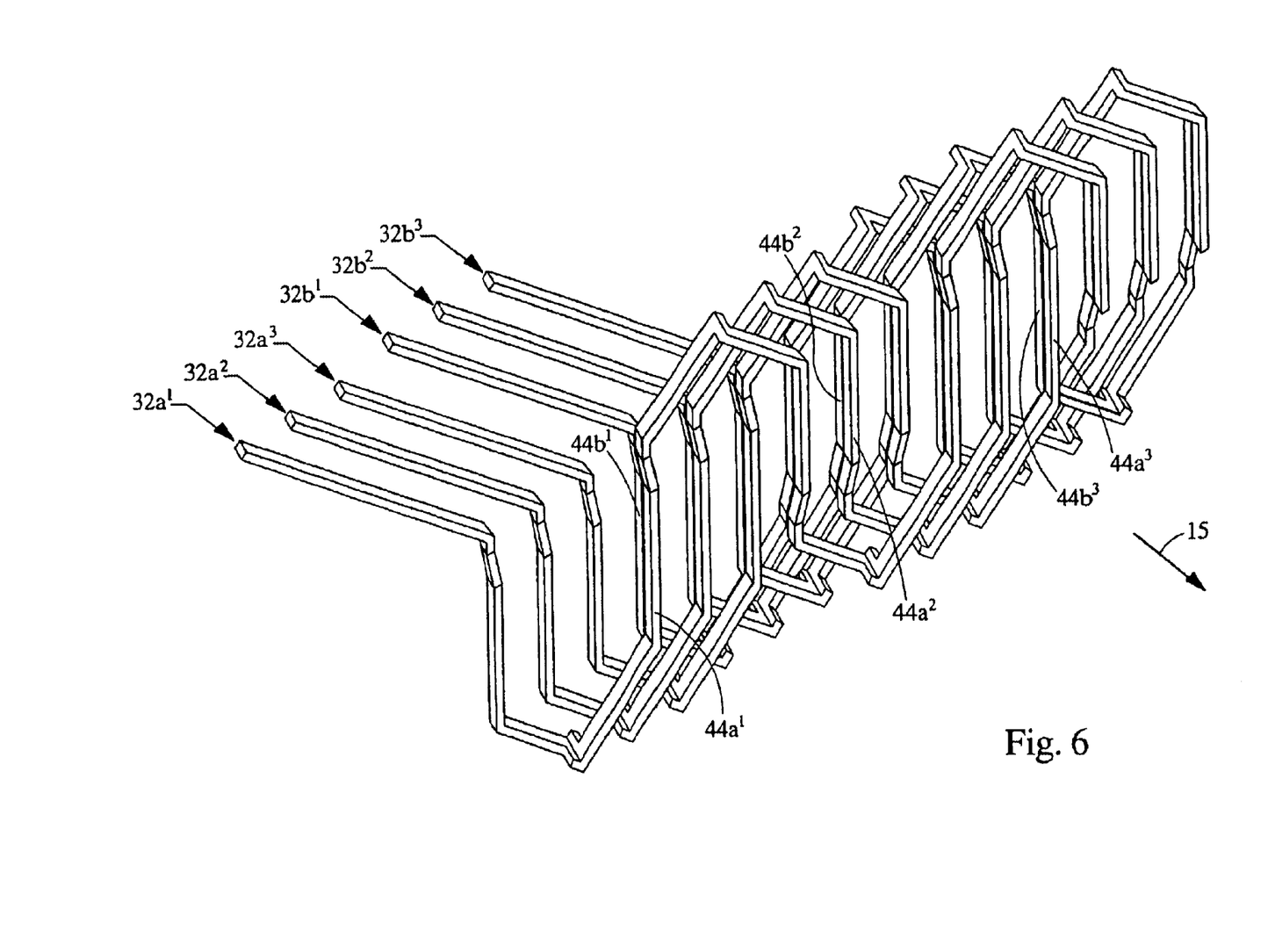
FIG. 6 is a perspective view of six conductors separated into three phases and two filars.

Turning now to FIG. 6, a combination of the layering, phasing, and multiple filar construction has been depicted. The portion of the stator winding 24 depicted in FIG. 6 has a bi-filar construction. That is, there are two filars (a and b) for each phase (1, 2 and 3). The conductors are phased, as denoted by the circumferential pitch between each of the conductors $32a^1$, $32a^2$, $32a^3$, $32b^1$, $32b^2$, $32b^3$. It can be seen that corresponding filars in each of the phases have straight segments 44 which reside in common slots 28. More specifically, straight segment $44a^1$ and straight segment $44b^1$ will reside in the same slot 28. Similarly, straight segment $44a^2$ will reside in a common slot 28 with straight segment $44b^2$. Finally, the same can be said for straight segments $44a^3$ and $44b^3$. In sum, the portion of the stator winding 24 depicted in FIG. 6 has a three phase and bi-filar construction.

It will also be recognized that the conductors $32a^1$, $32a^2$, $32a^3$, $32b^1$, $32b^2$, $32b^3$ define air flow paths which extend through the end loops, between the phases of the end loops, as well as between the layers of the end loops. This, in combination with the increased surface area generated by the reduced cross-sectional area and greater number of the conductors 32, greatly improves the cooling of the stator winding 24. Further, the structure of each conductor 32 is formed by the inverted triangle shape that has been described above. The inverted triangle shape along with the phasing and the cascade or interlaced design forms the structure that provides fixed spacing to define air flow paths between the conductors, and more specifically between the end loop segments 46.

Figure 7:
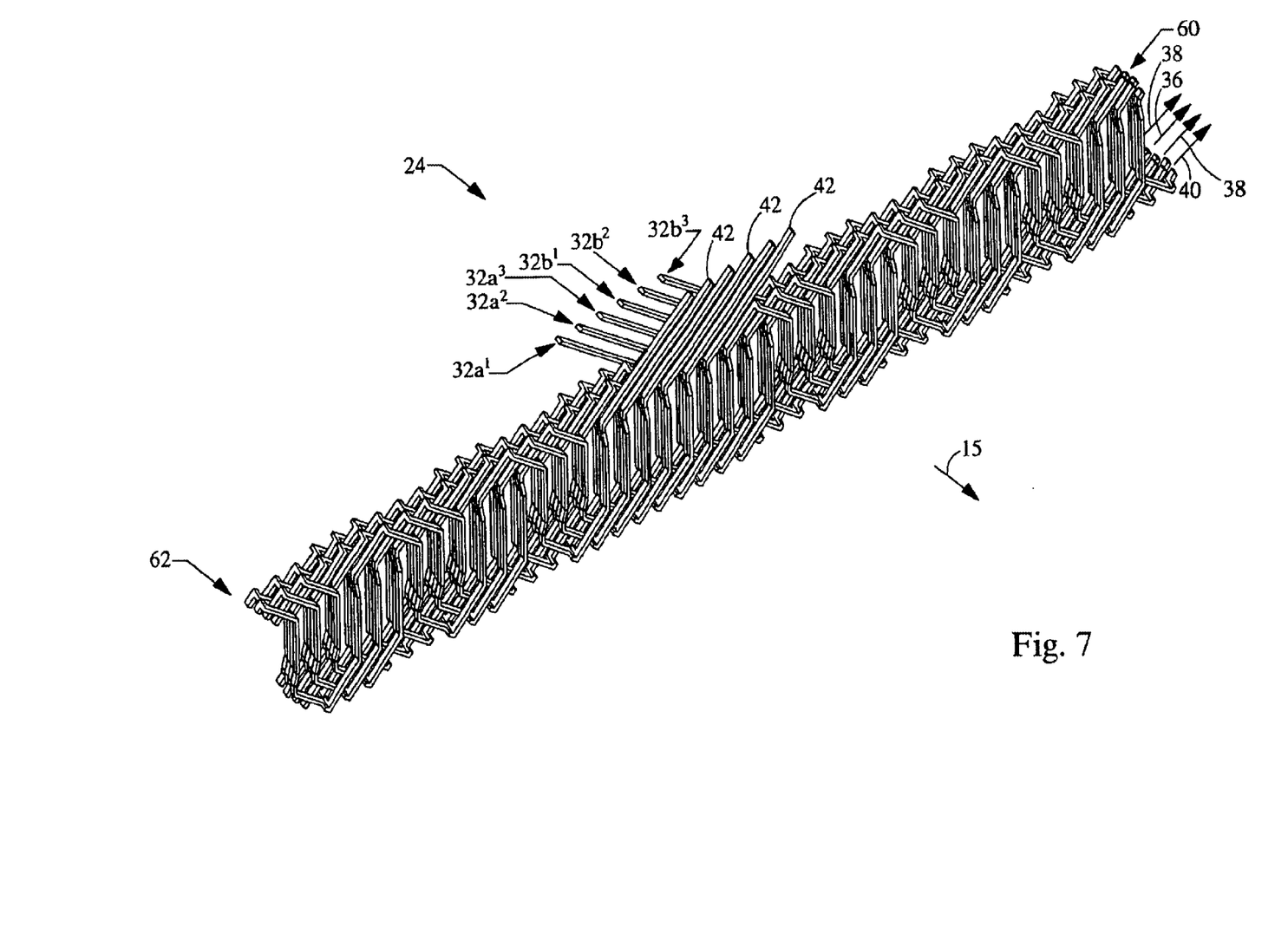
FIG. 7 is a perspective view of the complete stator winding partially depicted in FIG. 6.

A complete stator winding 24 has been shown in FIG. 7, but has been cut at one point and unraveled for depiction as a straight member. The stator winding 24 has a bi-filar construction as previously discussed, and denoted by conductors $32a^1$, $32a^2$, $32a^3$ forming a first filar, and the conductors $32b^1$, $32b^2$, $32b^3$ defining the second filar. Following each of these conductors towards the cut end denoted by numeral 60, the conductors 32 continue from the opposing cut end 62 back towards the leads 42. When each conductor 32 has made one complete turn (i.e. a complete revolution around the stator core 22) the conductor 32 includes an extra radial extension (not shown) which shifts the conductor over two layers for forming a second turn or revolution. For example, first conductor $32a^1$ includes straight segments which reside in the second layer 36 throughout its first turn. Then, conductor $32a^1$ shifts over to the fourth layer 40 and completes a second turn. The conductor $32a^1$ would then end with a terminating lead 42 as shown.

Accordingly, the stator winding 24 depicted in FIG. 7 represents a two turn, three phase, bi-filar construction. Additionally, the stator winding 24 includes six conductors and resides in four layers. Current high slot fill stator designs typically employ conductors having four electrical turns and four layers. However, by way of the present invention, a stator 20 can be formed with a stator winding 24 having four electrical turns and eight layers. Preferably, the number of layers is greater than six. Importantly, and by way of the present invention, the multiple filar construction allows small conductors to fill the same winding space as would be filled by the larger conductors, without increasing the number of electrical turns which increases the impedance and resistance of the winding. That is, two conductors electrically connected in parallel take up the same volume as would a larger conductor, but provide more surface area for convective cooling through the fixed spacing provided by the structure of the winding, of each conductor 32 and the stator winding 24.

Figure 9:
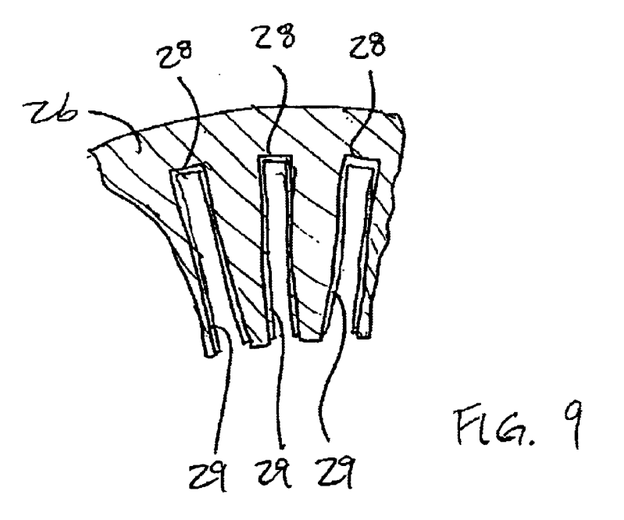
FIG. 9 is a cross-sectional view of the core similar to FIG. 2a, but showing the conductors removed.

Another advantage is obtained in that a bi-filar construction of the conductors 32 will have a smaller radial depth or width of a corresponding monofilar conductor, and therefore is not as stiff and will ease insertion into the slots 28 of the stator core 22. A less stiff wire will also minimize the force on paper insulation 29 (FIG. 9) positioned between the conductors 32 and the core 22 which will allow the use of thinner insulation paper such as less than 0.0045 inches. This will not only reduce cost, but it will also improve the slot fill factor. Finally, the radial ticks defined by radial extensions 52 proximate a portion of the and loops 46 of each conductor 32 in the outermost layer 34, extend radially beyond the radial position of the straight segments of the outermost layer 34 by approximately the radial width of one wire. For the bi-filar construction, the radial extensions 52 will not kick out as lar radially as the wires are now smaller in radial width. This will minimize the potential interference between the end loops 46 of the stator winding 24 from interfering with the housing that surrounds the stator. It will also allow the housing to fit closer to the stator winding 24 and therefore be smaller in diameter size which wil improve the power density, defined as output divided by alternator volume, of the alternator.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A stator for a dynamoelectric machine, comprising:
   a stator core having a generally cylindrical shape, the stator core having a plurality of circumferentially spaced slots,
   a stator winding including a plurality of conductors, each conductor having a plurality of straight segments interconnecting a plurality of end loop segments;
   the plurality of conductors organized into at least a first filar and a second filar,
   the plurality of conductors organized into multiple phases defined by a circumferential pitch, each phase having a conductor in the first filar and a conductor in the second filar;
   the plurality of conductors organized into layers, each layer representing a set of equidistant radial positions in the slots filled by the straight segments of the conductors;
   the end loop segments of the first and second filars being circumferentially aligned and axially opposite each other;
   the straight segments of corresponding conductors of the first and second filars residing in common slots in the stator core;
   the straight segments of one phase being positioned in the same layer as adjacent straight segments in the adjacent phase; and
   the plurality of conductors arranged in a cascading structure defined by at least three consecutive straight segments of one turn of one conductor residing in a common layer.

2. The stator of claim 1, wherein the plurality of conductors are structured to define air flow paths between the plurality of conductors.

3. The stator of claim 2, wherein the airflow paths extend between the layers of the stator winding.

4. The stator of claim 1, wherein each end loop segment and one straight segment connected to the end loop segment define a first radial extension and a second radial extension, the first and second radial extensions being in opposite directions.

5. The stator of claim 4, wherein the first radial extensions of the first filar are in a direction opposite the first radial extensions of the second filar.

6. The stator of claim 1, wherein the plurality of conductors each have a rectangular cross-sectional shape, and wherein the largest dimension between the width and depth is less than 2 mm.

7. The stator of claim 1, wherein the straight segments of corresponding conductors of the first and second filars reside in adjacent layers in the slots.

8. The stator of claim 1, wherein the each phase as a single continuous conductor forming the first filar and a single conductor forming the second filar.

9. The stator of claim 1, wherein the number of layers is greater than six.

10. The stator of claim 1, wherein the number of turns in each phase is equal to the number of layers divided by the number of filars.

11. The stator of claim 1, wherein the conductors are aligned in one radial row in each slot.

12. The stator of claim 11, wherein the width of the conductor fits closely to the width of the slot, including any insulation.

13. The stator of claim 1, the plurality of conductors arranged in a cascading structure defined by a majority of consecutive straight segments of one turn of one conductor residing in a common layer.

14. A stator for a dynamoelectric machine, comprising:
   a stator core having a generally cylindrical shape, the stator core having a plurality of circumferentially spaced core slots;
   a stator winding including a plurality of conductors extending through the core slots, each conductor having a plurality of straight segments interconnecting a plurality of end loop segments;
   the plurality of conductors organized into multiple phases, each phase having multiple filars, each filar of each phase being electrically connected to corresponding filars in each phase;

the plurality of conductors organized into layers, each layer representing a set of equidistant radial positions in the slots filled by the straight segments of the conductors; the plurality of conductors being arranged in a cascading structure defined by at least three consecutive straight segments of one turn of one conductor residing in a common layer; and each phase having conductors with straight segments residing in a common layer with straight segments of conductors of the other phases.

15. The stator of claim 14, wherein the plurality of conductors each have a rectangular cross-sectional shape, and wherein the greatest dimension of the width and depth is less than 2 mm.

16. The stator of claim 14, wherein the number of layers is greater than or equal to six and each phase has a single continuous conductor forming the first filar and a single conductor forming the second filar.

17. The stator of claim 14, wherein each conductor extends circumferentially around the stator core for at least two turns.

18. The stator of claim 14, wherein each end loop segment and one straight segment connected to the end loop segment define a first radial extension and a second radial extension, the first and second radial extensions being in opposite directions.

19. The stator of claim 18, wherein the first radial extensions of the filars corresponding to a first phase are in a direction opposite the first radial extensions of the filars corresponding to a second phase.

20. The stator of claim 14, wherein, the straight segments of each filar of each phase reside in common slots in the stator core.

21. The stator of claim 14, wherein the end loop segments of the first and second filars are circumferentially aligned and axially opposite each other.

22. The stator of claim 14, wherein the number of turns is equal to the number of layers divided by the number of filars.

23. The stator of claim 14, wherein the plurality of conductors are aligned in one radial row in each slot.

24. The stator of claim 14, wherein the plurality of conductors are structured to define air flow paths between the layers of conductors.

25. The stator of claim 14, further including a plurality of insulators located in the core slots having a thickness less than 0.0045 inches.

26. The stator of claim 14, wherein portions of the end loop segments extend beyond the radial position of the straight segments located in an outermost layer.

27. The stator of claim 26, wherein the portions of the end loop segments extend beyond the radial position of the straight segments located in the outermost layer by approximately one radial width of the conductor.

28. The stator of claim 14, wherein a plurality of consecutive straight segments of one conductor, reside in a common layer for substantially one revolution around the stator core.

* * * * *